United States Patent
Senecal et al.

(10) Patent No.: US 11,184,390 B2
(45) Date of Patent: Nov. 23, 2021

(54) BOT DETECTION IN AN EDGE NETWORK USING TRANSPORT LAYER SECURITY (TLS) FINGERPRINT

(71) Applicant: Akamai Technologies, Inc., Cambridge, MA (US)

(72) Inventors: David Senecal, Santa Clara, CA (US); Andrew Kahn, San Francisco, CA (US); Ory Segal, Herzliya (IL); Elad Shuster, Herzliya (IL); Duc Nguyen, Santa Clara, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 275 days.

(21) Appl. No.: 15/973,585

(22) Filed: May 8, 2018

(65) Prior Publication Data

US 2019/0190950 A1    Jun. 20, 2019

Related U.S. Application Data

(60) Provisional application No. 62/599,845, filed on Dec. 18, 2017.

(51) Int. Cl.
*H04L 29/06* (2006.01)
*G06N 20/00* (2019.01)
*H04L 29/08* (2006.01)

(52) U.S. Cl.
CPC ......... *H04L 63/1483* (2013.01); *G06N 20/00* (2019.01); *H04L 63/166* (2013.01); *H04L 67/02* (2013.01)

(58) Field of Classification Search
CPC .......... G06N 20/00; G06N 3/08; G06N 7/005; G06N 20/10; H04L 63/166; H04L 67/02; H04L 63/145; H04L 63/0281; H04L 2463/144; H04L 63/0272
See application file for complete search history.

(56) References Cited

U.S. PATENT DOCUMENTS

| | | | |
|---|---|---|---|
| 9,420,049 B1 * | 8/2016 | Talmor | H04L 63/1416 |
| 9,736,147 B1 * | 8/2017 | Mead | H04L 63/083 |
| 9,906,544 B1 | 2/2018 | Kurupati | |
| 10,387,980 B1 * | 8/2019 | Shahidzadeh | G06Q 40/123 |
| 10,438,225 B1 * | 10/2019 | Reading | G06Q 30/0225 |

(Continued)

OTHER PUBLICATIONS

Husak et al., "HTTPS traffic analysis and client identification using passive SSL/TLS fingerprinting", EURASIP Journal on Information Security, Published: Feb. 26, 2016.*

(Continued)

*Primary Examiner* — Morshed Mehedi
(74) *Attorney, Agent, or Firm* — David H. Judson

(57) ABSTRACT

This disclosure describes a technique to fingerprint TLS connection information to facilitate bot detection. The notion is referred to herein as "TLS fingerprinting." Preferably, TLS fingerprinting herein comprises combining different parameters from the initial "Hello" packet send by the client. In one embodiment, the different parameters from the Hello packet that are to create the fingerprint (the "TLS signature") are: record layer version, client version, ordered TLS extensions, ordered cipher list, ordered elliptic curve list, and ordered signature algorithms list. Preferably, the edge server persists the TLS signature for the duration of a session.

17 Claims, 4 Drawing Sheets

(56) References Cited

U.S. PATENT DOCUMENTS

| | | | |
|---|---|---|---|
| 10,587,629 B1 | 3/2020 | Kurupati et al. | |
| 10,601,862 B1 | 3/2020 | Kurupati et al. | |
| 10,686,818 B2 | 6/2020 | Kurupati | |
| 10,708,281 B1 | 7/2020 | Modalavalasa et al. | |
| 10,715,548 B2 | 7/2020 | Kurupati | |
| 10,754,935 B2 | 8/2020 | Kurupati | |
| 2016/0005029 A1* | 1/2016 | Ivey | G06Q 20/409 |
| | | | 705/44 |
| 2016/0006744 A1* | 1/2016 | Du | G06F 21/316 |
| | | | 726/4 |
| 2016/0057163 A1* | 2/2016 | Boffa | H04L 63/1425 |
| | | | 726/23 |
| 2016/0080337 A1 | 3/2016 | Pahl et al. | |
| 2017/0163647 A1* | 6/2017 | Cernoch | H04L 63/105 |
| 2017/0223049 A1* | 8/2017 | Kuperman | H04L 63/1466 |
| 2017/0288987 A1 | 10/2017 | Pasupathy et al. | |

OTHER PUBLICATIONS

Durumeric et al., "The Security Impact of HTTPS Interception", NDSS Symposium, San Diego, USA Internet Society, Feb. 2017.*
Costa et al., "Detecting mobile botnets through machine learning and system calls analysis", 2017 IEEE International Conference on Communications (ICC), Date of Conference: May 21-25, 2017.*
PCT/US2018/066227, International Search Report and Written Opinion, dated Apr. 12, 2019, 14 pages.
Fifield, et al., "Blocking-resistant communication through domain fronting," Privacy Enhancing Technologies Symposium (PETS), Jun. 2015.
Extended European Search Report, European Application No. 18892890.7, dated Aug. 4, 2021.
Amann, et al., "Exploring Tor's Activity Through Long-Term Passive TLS Traffic Measurement," Mar. 24, 2016.

* cited by examiner

BOT DETECTION IN AN EDGE NETWORK USING TRANSPORT LAYER SECURITY (TLS) FINGERPRINT

BACKGROUND

Technical Field

This application relates generally to protecting websites and mobile applications (apps) from automated attacks by scripts or bots using TLS connections.

Brief Description of the Related Art

Distributed computer systems are well-known in the prior art. One such distributed computer system is a "content delivery network" (CDN) or "overlay network" that is operated and managed by a service provider. The service provider typically provides the content delivery service on behalf of third parties (customers) who use the service provider's shared infrastructure. A distributed system of this type typically refers to a collection of autonomous computers linked by a network or networks, together with the software, systems, protocols and techniques designed to facilitate various services, such as content delivery, web application acceleration, or other support of outsourced origin site infrastructure. A CDN service provider typically provides service delivery through digital properties (such as a website), which are provisioned in a customer portal and then deployed to the network. A digital property typically is bound to one or more edge configurations that allow the service provider to account for traffic and bill its customer.

Transport Layer Security (TLS) and its predecessor, Secure Sockets Layer (SSL), are cryptographic protocols that provide Internet communication security. They use asymmetric cryptography for authentication and key exchange, symmetric encryption for confidentiality, and message authentication codes for message integrity. TLS/SSL is initialized at a session layer then works at a presentation layer. In particular, first the session layer has a handshake using an asymmetric cipher to establish cipher settings and a shared key for that session. Thereafter, a presentation layer encrypts the rest of the communication using a symmetric cipher and that session key. In both models, TLS and SSL work on behalf of the underlying transport layer, whose segments carry encrypted data. TLS is an IETF standards track protocol, defined in RFC 5246 and RFC 6176.

For a traditional RSA-based TLS session, the two sides of a connection agree upon a "pre-master secret" (PMS) which is used to generate the parameters for the remainder of the session. Typically, the two sides use RSA asymmetric encryption to establish the pre-master secret without exchanging the actual value in plaintext. In operation, the SSL client generates the pre-master secret and encrypts it with the TLS server's publicly available RSA key. This generates an encrypted pre-master secret (ePMS), which is then provided to the TLS server. The TLS server has a private decryption key, which is then used to decrypt the encrypted pre-master secret. At this point, both the client and the server have the original pre-master secret and can use it to generate the symmetric key used for actual encrypted and secure data exchange. Decrypting the encrypted pre-master secret is the only time in the TLS connection that the private key is needed. This decryption occurs at a so-called TLS termination point. Where a CDN is used to facilitate delivery of secure content, the TLS termination point will be located in the CDN.

All credential stuffing and other fraud attacks (gift card/loyalty point abuse, add-to-card, create new account, checkout) CDN customers are facing on a daily basis are done against an endpoint that requires a secure connection using SSL/TLS. Also, with the rise of HTTP/2, which is based on SSL/TLS, as well as customers starting to serve the entire content of their site securely, the amount of CDN-delivered secure traffic is increasing overall. By nature of SSL/TLS, no intermediate entity can nor should intervene or modify the data, except when users are behind a SSL proxy/accelerator that handles the outbound web request.

With the significant increase in TLS use, there is a significant need for enhancing bot detection techniques to detect scripts or bots that attempt to connect via TLS. The technique set forth herein addresses this need.

BRIEF SUMMARY

This disclosure describes a technique to fingerprint TLS connection information to facilitate bot detection. The notion is referred to herein as "TLS fingerprinting." Preferably, TLS fingerprinting herein comprises combining different parameters from the initial "Hello" packet send by the client. In one embodiment, the different parameters from the Hello packet that are used to create the fingerprint (the "TLS signature") are: record layer version, client version, ordered TLS extensions, ordered cipher list, ordered elliptic curve list, and ordered signature algorithms list. Preferably, the edge server persists the TLS signature for the duration of a session.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION

Figure 1:
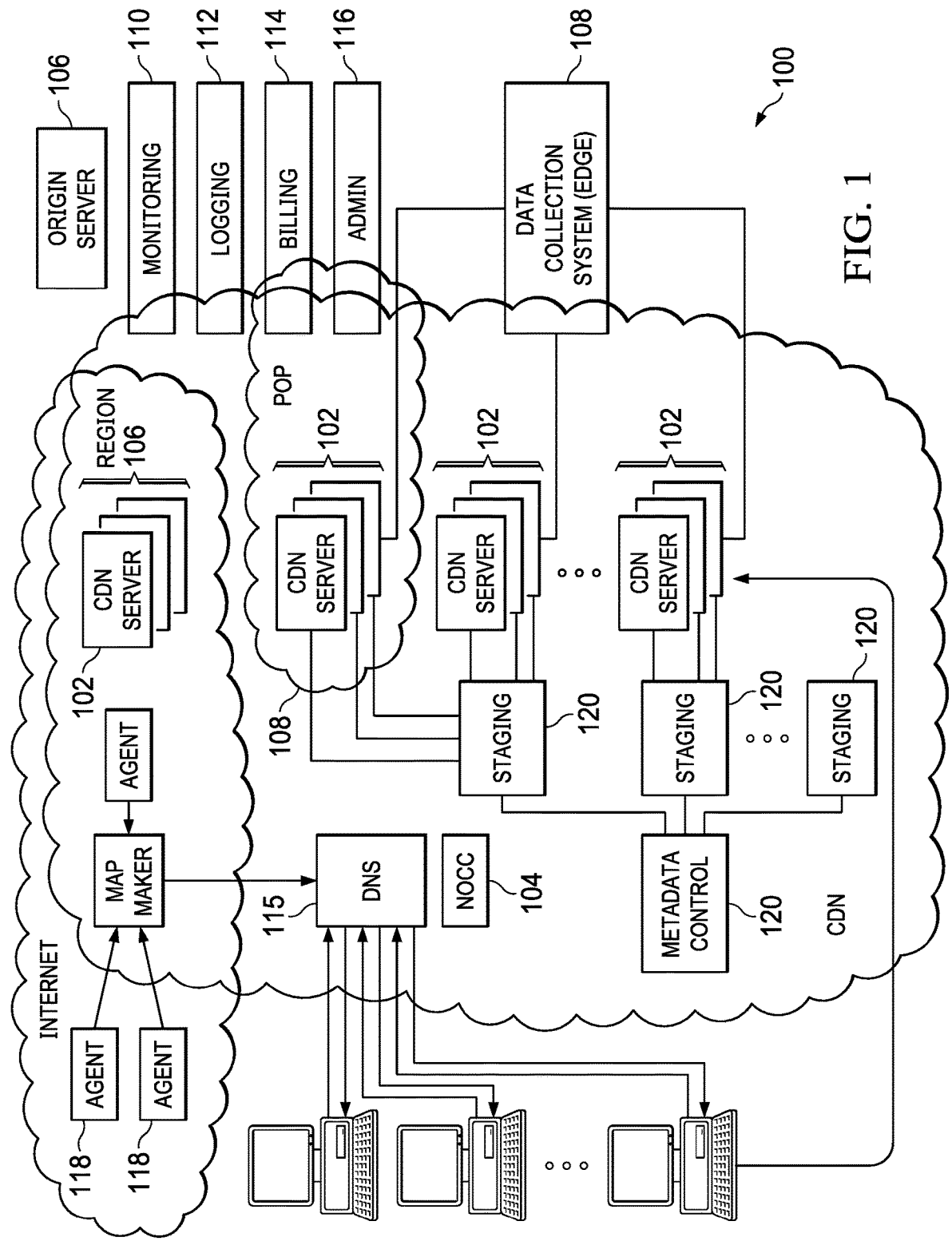
FIG. 1 is a block diagram illustrating a known distributed computer system configured as a content delivery network (CDN)

In a known system, such as shown in FIG. 1, a distributed computer system 100 is configured as a content delivery network (CDN) and is assumed to have a set of machines 102*a-n* distributed around the Internet. Typically, most of the machines are servers located near the edge of the Internet, i.e., at or adjacent end user access networks. A network operations command center (NOCC) 104 manages operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or sub-domains to domains that are managed by the service provider's authoritative domain name service. End users that desire the content are directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

Figure 2:
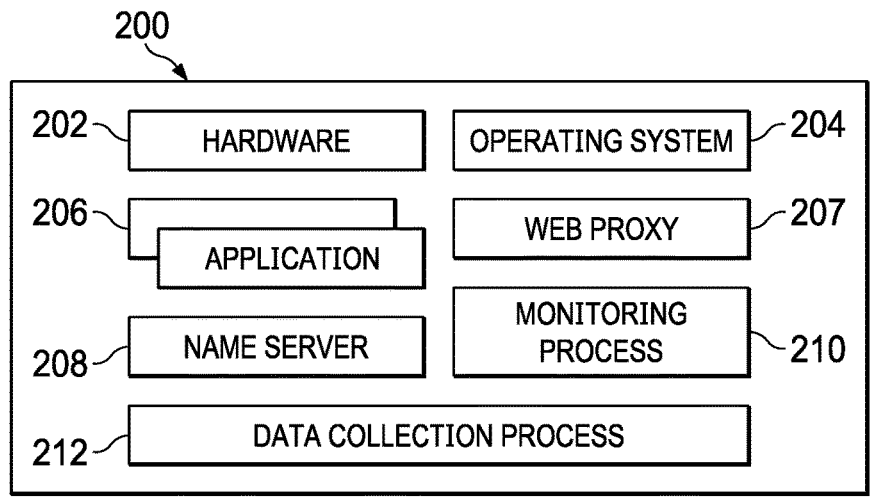
FIG. 2 is a representative CDN edge machine configuration.

As illustrated in FIG. 2, a given machine 200 comprises commodity hardware (e.g., an Intel Pentium processor) 202 running an operating system kernel (such as Linux or variant) 204 that supports one or more applications 206*a-n*. To facilitate content delivery services, for example, given machines typically run a set of applications, such as an HTTP proxy 207 (sometimes referred to as a "global host" process), a name server 208, a local monitoring process 210, a distributed data collection process 212, and the like.

A CDN edge server is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

The CDN may provide secure content delivery among a client browser, edge server and customer origin server in the manner described in U.S. Publication No. 20040093419. Secure content delivery as described therein enforces SSL-based links between the client and the edge server process, on the one hand, and between the edge server process and an origin server process, on the other hand. This enables an SSL-protected web page and/or components thereof to be delivered via the edge server.

As an overlay, the CDN resources may be used to facilitate wide area network (WAN) acceleration services between enterprise data centers (which may be privately-managed) and third party software-as-a-service (SaaS) providers.

In a typical operation, a content provider identifies a content provider domain or sub-domain that it desires to have served by the CDN. The CDN service provider associates (e.g., via a canonical name, or CNAME) the content provider domain with an edge network (CDN) hostname, and the CDN provider then provides that edge network hostname to the content provider. When a DNS query to the content provider domain or sub-domain is received at the content provider's domain name servers, those servers respond by returning the edge network hostname. The edge network hostname points to the CDN, and that edge network hostname is then resolved through the CDN name service. To that end, the CDN name service returns one or more IP addresses. The requesting client browser then makes a content request (e.g., via HTTP or HTTPS) to an edge server associated with the IP address. The request includes a host header that includes the original content provider domain or sub-domain. Upon receipt of the request with the host header, the edge server checks its configuration file to determine whether the content domain or sub-domain requested is actually being handled by the CDN. If so, the edge server applies its content handling rules and directives for that domain or sub-domain as specified in the configuration. These content handling rules and directives may be located within an XML-based "metadata" configuration file.

Thus, and as used herein, an "edge server" refers to a CDN (overlay network) edge machine. For a given customer, the CDN service provider may allow a TCP connection to originate from a client (e.g., an end user browser, or mobile app) and connect to an edge machine representing the customer on a virtual IP address (VIP) assigned to the customer, or a general VIP that allows for discovery of the intended customer. For purposes of this disclosure, it is assumed that this edge machine does not have the customer's private key or the customer's certificate.

Figure 3:
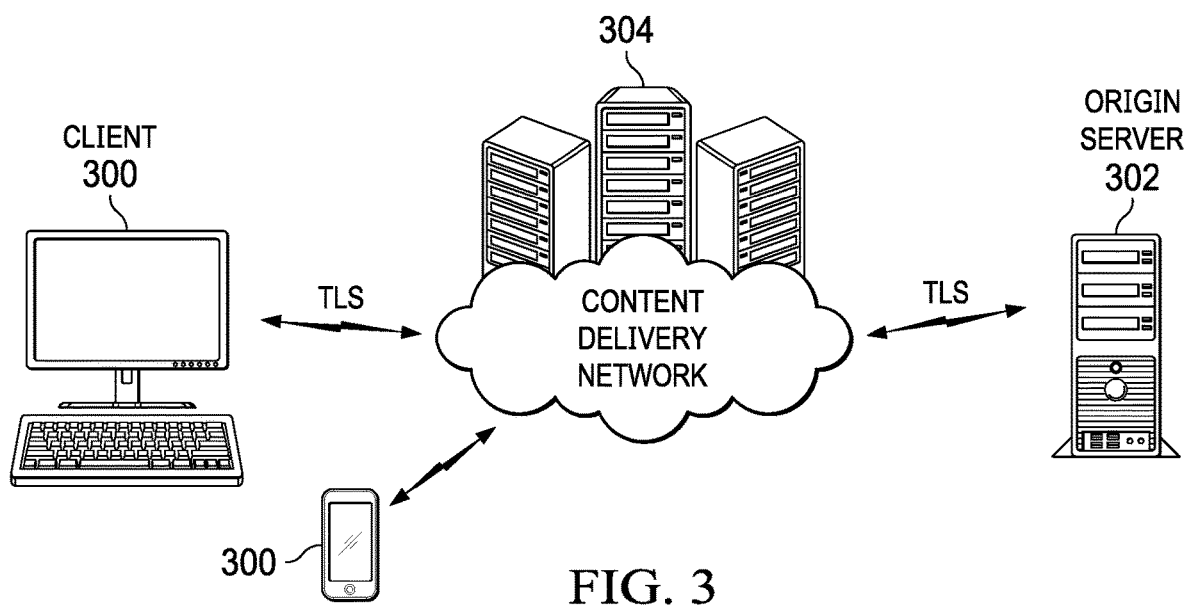
FIG. 3 is a representative active TLS session among a client, an edge server, and an origin server and into which the edge server, with permission, is enabled to shunt into without a certificate and/or private key according to this disclosure.

As illustrated in FIG. 3, in the typical interaction scenario, an end user client browser or mobile app 300 is associated with a customer origin server (or "origin") 302 via the intermediary of an overlay network edge machine server instance 304 (sometimes referred to as an "edge server"). The terms "origin" or "edge" are not intended to be limiting. In a typical embodiment, the client establishes a TLS connection with the edge machine server instance 304, which terminates the TLS connection. The edge server then establishes a separate TLS connection with the origin 302. Familiarity with the TLS Specification is presumed. Once a TLS handshake is complete between the client and the edge server, or the edge server and the origin, each side of the connection will have negotiated a Pre-Master Secret and exchange random number values for the session. According to the TLS 1.2 Specification Section 8.1, each side will have converted its Pre-Master Secret into a Master Secret using an agreed-upon pseudo-random function (PRF), such as an HMAC variant. The TLS 1.2 Specification Section 6.3 notes that this Master Secret is then converted into a larger key block, which is then used to calculate the following TLS items: client_Write_MAC_key (the key that be used as input to the client's sent data message authentication codes (MACs)), wherein each TLSCipherText record has a MAC that verifies the data in the record is authentic and unchanged); server_Write_MAC_key (the key that will be used as input to the server's sent data MACs); client_Write_key (the key that will be used for the agreed-upon bulk encryption cipher for client sent data; and server_Write_key (the key that will be used for the agreed-upon bulk encryption cipher for server sent data). Other items may be calculated but, for purposes of this protocol, are not relevant.

TLS Fingerprinting

Figure 4:
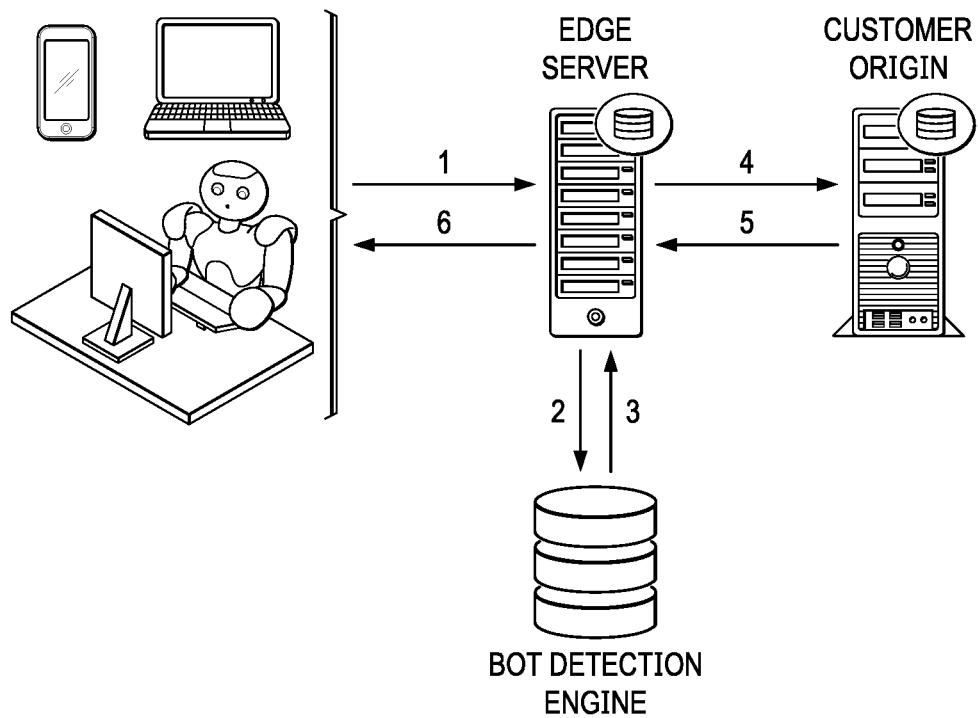
FIG. 4 is an embodiment of a TLS fingerprint detection scheme of this disclosure.

With the above as background, the basic workflow is depicted in FIG. 4. At step (1), the client (mobile device, laptop or bot) establishes a secure connection with the edge server. At step (2), the edge server extract the TLS parameters sent by the client (typically from the Client Hello) and computes a hash, preferably using a one-way hash function. The TLS hash value (a message digest) is sent to a learning system along with other characteristics available in the request, such as: HTTP request header order, User-agent value, HTTP version, Client IP address, Referer, canvas fingerprint, and perhaps others. At step (3), heuristics are run, preferably on a regular basis, against the information collected on the learning system to statistically establish which fingerprint is typical of a legitimate client/user. and which one is typical of an automated system. In one example embodiment, this method enables the system to identify automated system spoofing to a legitimate Chrome user-agent. The learning system responds to the edge with a score (e.g., 0=good, 1=bad). At step (4), if the score indicates that the client is not a legitimate (good) client, the edge server may be configured to take an action on the request (deny, tarpit, serve alternate content), or it may simply pass the request forward the customer origin server if the customer elects only to monitor the traffic. At step (5), the customer origin server processes the request and respond with the requested content. At step (6), the edge server passes the customer origin server response to the client.

The following describes several variants.

Figure 5:
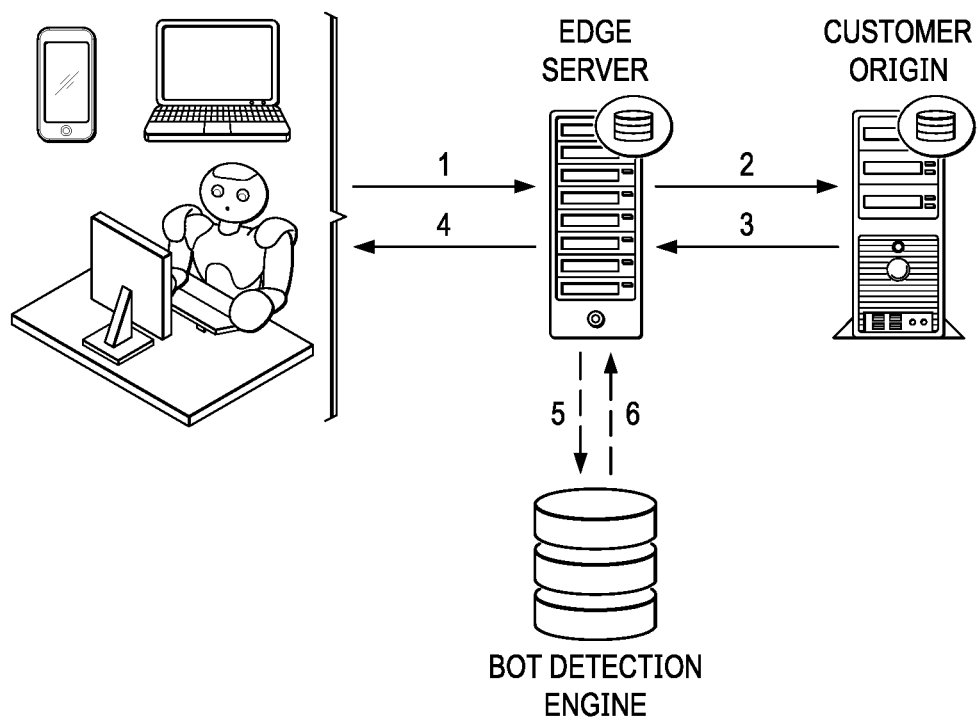
FIG. 5 is another embodiment of the TLS fingerprint detection scheme.

Thus, in one embodiment, the learning data from step (2) above may be delivered out-of-band (namely, outside of the request flow). Also, the learning system may publish to the edge a list of known bad signatures (e.g., a combination of TLS hash+header order+user-agent) so that the evaluation in step (3) does not require a call to an external database. FIG. 5 depicts a preferred implementation, which is now described.

At step (1), the client (mobile device, laptop or bot) establishes a secure connection with the CDN edge server. At step (2), the edge server computes the TLS hash and the header order hash, and extracts the user-agent, method, request type. At this point, the edge preferably checks all this information against a known bad signature directory. If the request signature is found in the bad signature directory, the edge server may be configured to take an action on the request (deny, tarpit, serve alternate content), or it may simply pass the request forward the customer origin server, e.g., if the customer chooses to only monitor the traffic. At step (3), the customer origin server processes the request and respond with the requested content. At step (4), the edge server passes the customer origin server response to the client. At step (5), the edge server passes the data collected to the learning system. At step (6), the learning system publishes to the edge a new list of bad signature(s), preferably periodically. In an alternative embodiment, the new list of bad signature(s) may be published to the edge continuously or asynchronously, in response to a given event or occurrence.

Figure 6:
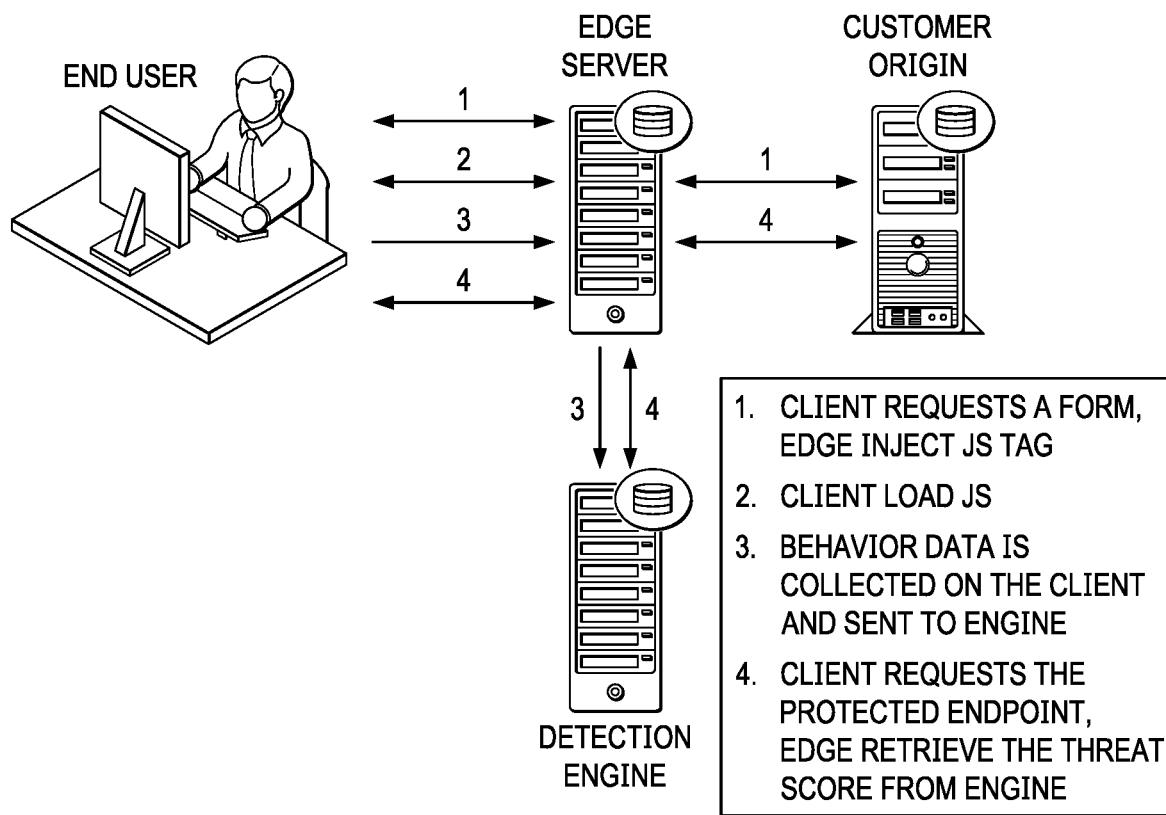
FIG. 6 is another depiction of the detection scheme.

Thus, and as depicted in FIG. 6, JavaScript-based technology collects a lightweight fingerprint and other behavioral data from the client. The data is collected asynchronously and sent to the bot detection engine. On a protected request (e.g. TLS-secured POST login), the edge server obtains the client classification from the bot detection engine and applies it on the edge.

Several methods may be used to detect bots using the TLS fingerprint include, without limitation, anomaly detection, dynamic rate limiting, and blacklisting.

Anomaly detection is based on the principle that good browsers (such as Chrome, Firefox, Safari, and the like) have a few valid combinations of TLS fingerprints for each browser version. The "known" or "correct" combinations are learned a-priori. This can be done by analyzing prior human traffic and building a table of valid combinations (user agent and associated TLS fingerprint possibilities). A bot script masquerading its user-agent as one of the well-known browsers is then caught by checking for the existence of the user-agent and the TLS fingerprint in the "known/correct" table.

Dynamic rate limiting is based on the principle that the system keeps tracks of the received TLS fingerprints and then rate limits TLS fingerprints. Bot Attacks can be blocked in this way, as the TLS fingerprint will rapidly exceed the allowed rate threshold.

Blacklisting is based on the principle that the TLS fingerprints of malicious bot tools can be collected and stored in a database/file (also known as a blacklist file). When a TLS fingerprint is part of this blacklist file, it is then blocked.

All of the above techniques can be modulated with other signals to produce higher accuracy.

The above-described TLS fingerprinting scheme may operate in association with a browser validation process that collects information from the client using JavaScript techniques to help identify the type of client machine the edge server is interacting with and the configuration of the browser. The process does not collect any information that could identify the user of the machine. The data collected (also known as the fingerprint) is sent to a data collection platform and kept for a given time period. Preferably, the fingerprint is used to enable the provider to research and define new heuristics that help the bot detection engine to detect more advanced bots. These heuristics are preferably instantiated as detection rules and become part of a fingerprint evaluation ruleset. Preferably, the fingerprint process is only executed once a session. By analyzing the fingerprint and combining multiple parameters of the fingerprints together, it is possible to uniquely identify the client and to identify which site protected with the browser validation technology a given client visited. As additional related fingerprint information is collected and analyzed, the fingerprint evaluation ruleset may evolve, allowing the system to detect more bots. Preferably, clients that are identified as bots are tracked through their session cookie. The session cookie is unique to a given web site and cannot be used to correlate the activity of a given bot on other web sites, although the system may provide for the ability to track the activity of a botnet across customers that use the bot detection service. Activity coming from these bots preferably is tracked and reported. Logs of this activity are then to generate bot activity and bot analysis reports that can be reviewed by a customer through a secure portal.

The TLS fingerprint information can also be supplemented with other information, e.g., a response from the origin (success or failed login). Behavioral data collected from the client, together with such origin response data, can be combined with the TLS fingerprint to build up a TLS blacklist.

Other Enabling Technologies

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines. The functionality may be provided as a service, e.g., as a SaaS solution.

The techniques herein may be implemented in a computing platform, such as variously depicted and described above, although other implementations may be utilized as well. One or more functions of the computing platform may be implemented conveniently in a cloud-based architecture. As is well-known, cloud computing is a model of service delivery for enabling on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

The platform may comprise co-located hardware and software resources, or resources that are physically, logically, virtually and/or geographically distinct. Communication networks used to communicate to and from the platform services may be packet-based, non-packet based, and secure or non-secure, or some combination thereof. More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a standalone machine, or across a distributed set of machines.

Each above-described process, module or sub-module preferably is implemented in computer software as a set of program instructions executable in one or more processors, as a special-purpose machine.

Representative machines on which the subject matter herein is provided may be Intel Pentium-based computers running a Linux or Linux-variant operating system and one or more applications to carry out the described functionality. One or more of the processes described above are implemented as computer programs, namely, as a set of computer instructions, for performing the functionality described.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A given implementation of the computing platform is software that executes on a hardware platform running an operating system such as Linux. A machine implementing the techniques herein comprises a hardware processor, and non-transitory computer memory holding computer program instructions that are executed by the processor to perform the above-described methods.

There is no limitation on the type of computing entity that may implement the client-side or server-side of the connection. Any computing entity (system, machine, device, program, process, utility, or the like) may act as the client or the server. While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The platform functionality may be co-located or various parts/components may be separately and run as distinct functions, perhaps in one or more locations (over a distributed network).

One preferred implementation of the TLS fingerprint based bot detector is in a managed service such as a content delivery network (CDN) or, more generally, an "overlay network" that is operated and managed by a service provider. The service provider typically provides the content delivery service on behalf of third parties (customers) who use the service provider's shared infrastructure. A distributed system of this type typically refers to a collection of autonomous computers linked by a network or networks, together with the software, systems, protocols and techniques designed to facilitate various services, such as content delivery, web application acceleration, or other support of outsourced origin site infrastructure. A CDN service provider typically provides service delivery through digital properties (such as a website), which are provisioned in a customer portal and then deployed to the network. A digital property typically is bound to one or more edge configurations that allow the service provider to account for traffic and bill its customer.

The techniques herein may leverage machine learning (ML) to iteratively learn from data. As is well-known, machine learning tasks are typically classified into several categories depending on the nature of the learning signal or feedback available to a learning system: supervised learning, unsupervised learning, and reinforcement learning. In supervised learning, the algorithm trains on labeled historic data and learns general rules that map input to output/target. In particular, the discovery of relationships between the input variables and the label/target variable in supervised learning is done with a training set. The computer/machine learns from the training data. Supervised learning algorithms are Support Vector Machines, Linear Regression, Logistic Regression, Naive Bayes, and Neural Networks. In unsupervised machine learning, the algorithm trains on unlabeled data. In reinforcement learning, the algorithm learns through a feedback system. In one embodiment, the bot detection engine uses supervised machine learning to evolve the ruleset based on the TLS data detection previously described.

The technique of this disclosure provides significant advantages. As described, the preferred approach creates a message digest of relevant portions of the Client Hello; this facilitates transporting the data on a network, querying on the data, creating databases, and building a machine learning model of relevant data.

What we claim now follows:

1. A method of bot detection in a computer network, comprising:
  responsive to establishment of a secure connection initiated by a client, and in association with a client request:
    receiving and extracting a set of transport layer security parameters, the set of transport layer parameters having been generated in association with execution of a script;
    processing the set of transport layer security parameters into a fingerprint, wherein a given transport layer security parameter of the set is not recoverable from the fingerprint;
    forwarding the fingerprint to an external machine learning system to determine, based at least in part on the fingerprint, whether the client is likely to be a bot as opposed to a human user;
    receiving a score from the external machine learning system, wherein the score has a first value when the fingerprint is determined to be associated with a good client, and wherein the score has a second value when the fingerprint is determined to be associated with a bot; and
    responsive to receipt of the score with the second value, taking an action with respect to the client based on a determination, as represented by the score with the second value, that the client is likely to be a bot as opposed to a human user.

2. The method as described in claim 1 wherein the set of transport layer security parameters are associated with a Transport Layer Security (TLS) connection initiated by the client.

3. The method as described in claim 2 wherein the TLS connection is initiated by the client by a client hello message.

4. The method as described in claim 3 wherein the set of transport layer security parameters comprise information derived from the client hello message, the information being at least one of: a record layer version, a client version, a set of ordered TLS extensions, an ordered cipher list, an ordered elliptic curve list, and an ordered signature algorithms list.

5. The method as described in claim 1 further including persisting the fingerprint for a duration of a session associated with the client request.

6. The method as described in claim 1 wherein the processing includes applying a one-way hash function to the set of transport layer security parameters to produce the fingerprint.

7. The method as described in claim 1 wherein evaluating the fingerprint includes forwarding other data to the external machine learning system.

8. The method as described in claim 7 wherein the other data is one of: an HTTP request header order, a user-agent value, an HTTP version number, a client IP address, a Referer header value, and a canvas fingerprint.

9. The method as described in claim 1 wherein the action is one of: denying the client request, tarpit the client request, serving alternative content in response to the client request, passing the client request forward to an origin, and serving a response to the client request.

10. The method as described in claim 1 wherein evaluating the fingerprint includes checking the fingerprint against a data set of known bad fingerprints.

11. The method as described in claim 1 including updating a set of known bad fingerprints to include the fingerprint when the fingerprint is determined to represent a bot.

12. The method as described in claim 1 wherein the set of transport layer security parameters are received in association with a TLS-secured HTTP POST message.

13. The method as described in claim 1 wherein evaluating the fingerprint includes one of anomaly detection, dynamic rate limiting, and blacklisting.

14. Apparatus associated with an overlay network, comprising:
  a hardware processor;
  computer memory holding computer program instructions executed by the hardware processor, the computer program instructions comprising program code configured to:
    respond to establishment of a secure connection initiated by a client, and in association with a client request:
      receive and extract a set of Transport Layer Security (TLS) parameters, the set of TLS parameters having been generated in association with execution of a script;
      apply a one-way hash function to the set of TLS parameters to generate a fingerprint;
      forward the fingerprint to an external machine learning system to determine, based at least in part on the fingerprint, whether the client is likely to be a bot as opposed to a human user;
      receive a score from the external machine learning system, wherein the score has a first value when the fingerprint is determined to be associated with a good client, and wherein the score has a second value when the fingerprint is determined to be associated with a bot; and
      responsive to receipt of the score with the second value, take an action with respect to the client based on a determination, as represented by the score with the second value, that the client is likely to be a bot as opposed to a human user.

15. The apparatus as described in claim 14 wherein the set of TLS parameters comprise information derived from a client hello message, the information being at least one of: a record layer version, a client version, a set of ordered TLS extensions, an ordered cipher list, an ordered elliptic curve list, and an ordered signature algorithms list.

16. The apparatus as described in claim 14 wherein the overlay network is a content delivery network and the program code also comprises a web proxy.

17. The apparatus as described in claim 14 wherein the action is one of: denying the client request, tarpit the client request, serving alternative content in response to the client request, passing the client request forward to an origin, and serving a response to the client request.

* * * * *